United States Patent [19]

Kusaka

[11] Patent Number: 5,105,281

[45] Date of Patent: Apr. 14, 1992

[54] PRINTER

[75] Inventor: Satoshi Kusaka, Tokyo, Japan

[73] Assignee: Sony Corporation, Tokyo, Japan

[21] Appl. No.: 486,510

[22] Filed: Feb. 28, 1990

[30] Foreign Application Priority Data

Feb. 28, 1989 [JP] Japan .................. 1-47910

[51] Int. Cl.$^5$ .............. H04N 1/23; H04N 1/46; H04N 1/036; G01D 15/14

[52] U.S. Cl. ................. 358/302; 346/107 R; 358/75

[58] Field of Search ........... 358/302, 75; 346/107 R, 346/108, 160, 157; 354/4; 355/32, 71

[56] References Cited

U.S. PATENT DOCUMENTS 4,605,972 8/1986 Hatanaka .................. 358/302

4,636,817 1/1987 Masaki .................. 346/160

Primary Examiner—Mark J. Reinhart
Assistant Examiner—Scott A. Rogers
Attorney, Agent, or Firm—Lewis H. Eslinger

[57] ABSTRACT

A color video printer has a liquid crystal body acting as a shutter extending across a color printing paper. The liquid crystal body includes a first shutter array for a first color, a second shutter array for a second color, and a third shutter array for a third color, and an electrical arrangement for supplying first, second, and third color signals to the respective first, second, and third shutter arrays. Relative motion between the liquid crystal body and the color printing paper is provided in a direction to cause the liquid crystal body to scan the paper.

5 Claims, 7 Drawing Sheets

PRINTER

BACKGROUND OF THE INVENTION

1. Field of the Invention

This invention relates generally to printing apparatus and, more particularly, to a color video printer in which light is projected onto a color sensitive printing paper, such as an instant and self-developing photo-sensitive film, through a liquid crystal shutter that is controlled by a video signal.

2. Description of the Background

A printing apparatus that can obtain a so-called hard copy of a visual image corresponding to a video signal recorded by an electronic still camera or to a video signal supplied from a television receiver is described in Japanese Pat. Laid-Open Gazette No. 60-81986. That Japanese published application describes a printing apparatus in which a color image corresponding to a video signal can be formed by irradiating light onto a color sensitive printing paper through liquid crystal shutters whose opening and closing is controlled by the video signal. This kind of printing apparatus utilizing liquid crystal shutters is low-powered and compact-sized and is inexpensive, so that it is now becoming commercially viable as a home color video printer.

Figure 1:
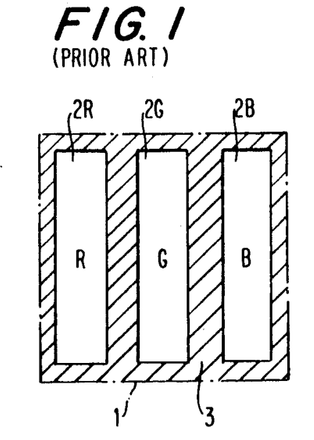
FIG. 1 is a plan view of a previously proposed liquid crystal shutter for a color printing apparatus.

When a color visual image is projected onto a color sensitive printing paper by the prior-art printing apparatus utilizing liquid crystal shutters, as shown in FIG. 1, a color picture element 1, which is the minimum unit of the color image and may be thought of as one colored dot. This color picture element 1 is formed of a red portion 2R of a red micro-shutter element, a green portion 2G of a green micro-shutter element, and a blue portion 2B a blue micro-shutter element. In FIG. 1, a separating band portion 3 of the color picture element 1 separates the respective micro-shutter elements.

Using the known liquid crystal shutter, if the magnification of optical system is taken as "1", the area of the picture dot resulting from color picture element 1 can only be the sum of the areas of the three micro-shutter elements 2R, 2G, 2B in the liquid crystal shutter, so that resolution of the color visual image is limited.

OBJECTS AND SUMMARY OF THE INVENTION

Accordingly, it is an object of the present invention to provide an improved color video printer that can eliminate the above-described defects inherent in previously proposed printers.

Another object of the present invention is to provide an improved color video printer in which the same portion of the color sensitive printing paper is exposed three times, through the red, green, and blue shutter arrays in an additive, primary-color fashion, whereby resolution of the resultant color image can be improved about three times as compared with the prior art.

It is another object of the present invention to provide an improved color video printer in which the effective ratio between the visual image of the liquid crystal shutter and the image area formed on the color sensitive printing paper can be substantially 100%, thereby improving the image quality.

According to an aspect of the present invention, a color video printer has a liquid crystal body extending in a lateral direction relative to the printing paper, in which the liquid crystal body includes a first shutter array for a first color, a second shutter array for a second color, and a third shutter array for a third color. A circuit is provided for supplying first, second, and third color signals to the respective first, second, and third shutter arrays, while moving the liquid crystal body relative to a color sensitive printing paper.

The above and other objects, features, and advantages of the present invention will become apparent from the following detailed description of preferred embodiments when read in conjunction with the accompanying drawings, in which like reference numerals are used to identify the same or similar parts in the several views.

DETAILED DESCRIPTION OF PREFERRED EMBODIMENTS

Referring to the drawings in detail, and initially to FIGS. 2 through 5, a color video printer according to an embodiment of the present invention is described, in which the present invention is advantageously applied to a video hard-copy apparatus for an electronic still camera.

Figure 2:
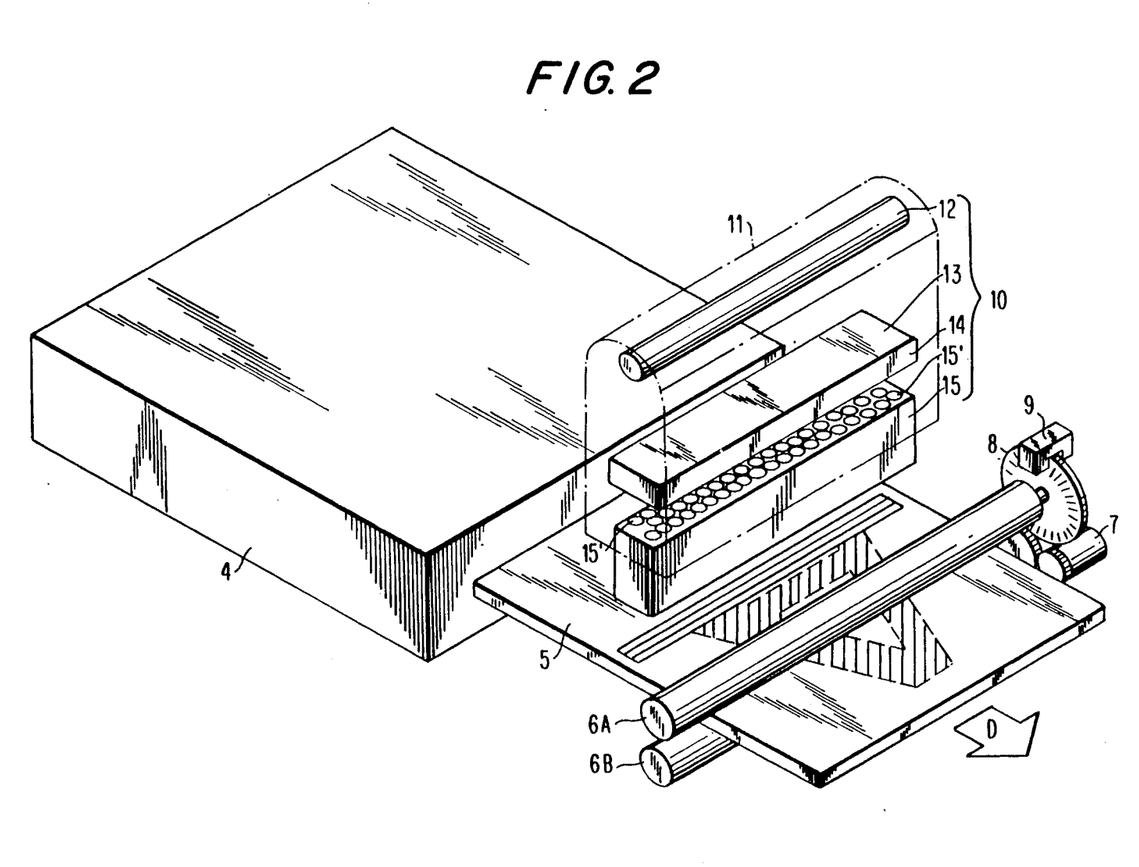
FIG. 2 is a perspective view of a color video printer showing the arrangement of the shutter element according to an embodiment of the present invention.

In FIG. 2, a silver salt film such as used in an instant camera film is provided as the color sensitive printing paper and is accommodated within a film pack 4 such that the film 5 may be moved in the direction of arrow D. More specifically, film 5 extends between film pack 4 and a pair of rollers 6A and 6B, such that when roller 6B is rotated by a motor 7, film 5 is moved or drawn toward direction D. A disc 8 having slits formed around the outer peripheral portion thereof with a predetermined pitch is mounted on a shaft of roller 6A, and a photo detector 9, formed of light emitting and receiving elements, is secured to a base of the apparatus (not shown), so that detector 9 surrounds the slits formed on the outer peripheral portion of disc 8. It will be appreciated that disc 8 and detector 9 constitute a rotary or angular encoder. Detector 9 in the rotary encoder is adapted to supply a control circuit (shown in FIG. 4) with a detected signal having pulses whose number corresponds to a rotational angle of roller 6A, which in turn corresponds to the liner displacement film 5.

A liquid crystal printing head 10 includes an optical shield 11, a lamp 12, a color filter 13, a liquid crystal shutter 14, and a lens array 15 all of which are located in substantially parallel relationship. Lens array 15 is formed by aligning a number of distributed-index lenses 15', each forming an erect image of magnification "1". That is, the erect image is not reversed left-to-right, nor is it a mirror image. Lens array 15 is adapted to form images on film 5 of respective micro-shutter elements in liquid crystal shutter 14.

Figure 3:
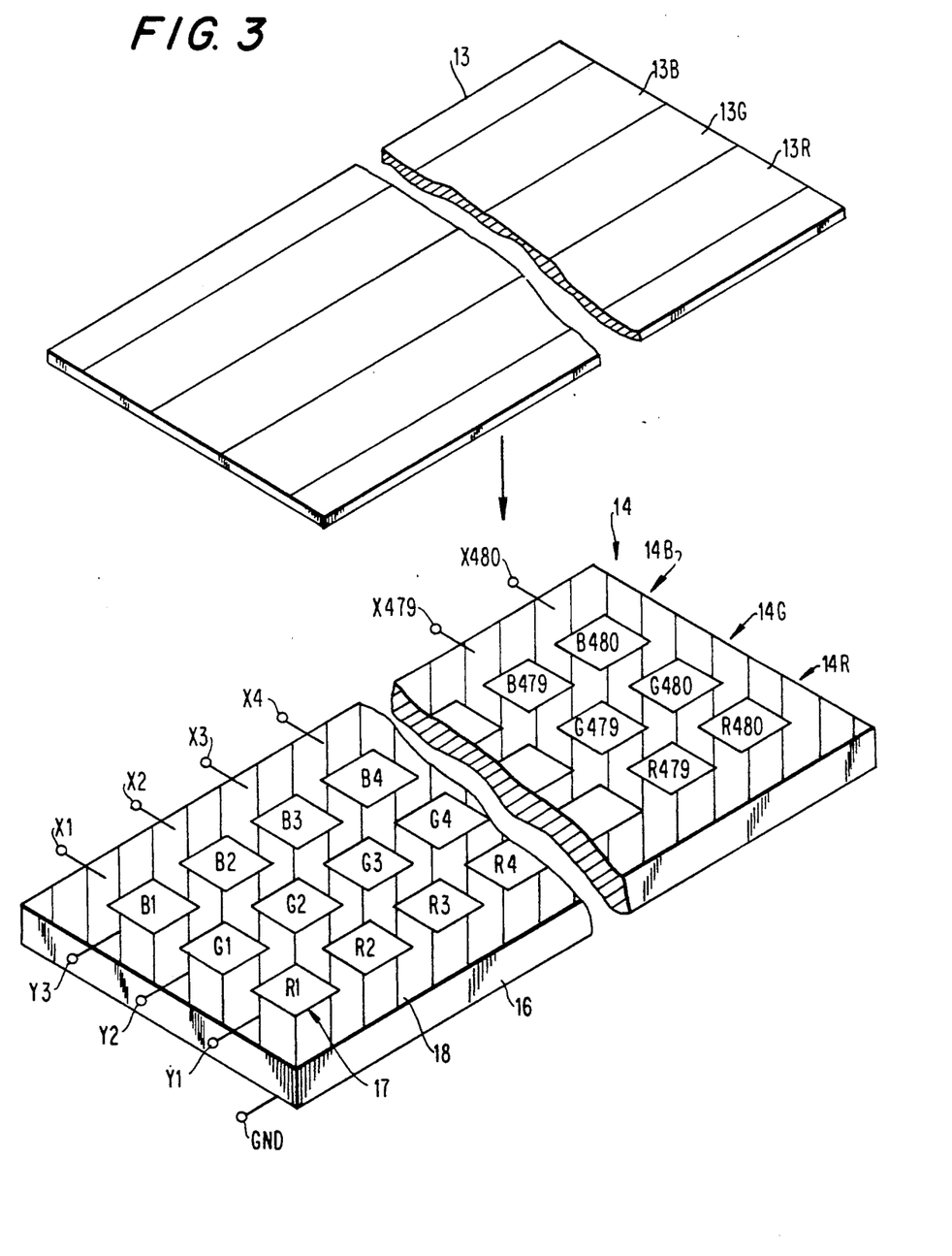
FIG. 3 is an exploded perspective view illustrating a liquid crystal shutter and a color filter used in the embodiment of FIG. 2.

FIG. 3, shows color filter 13 in liquid crystal printing head 10 formed of three, stripe-shaped, colored filters, specifically, a red filter 13R, a green filter 13G, and a blue filter 13B. In correspondence to these red, green, and blue filters, 13R, 13G, and 13B, liquid crystal shutter 14 provides three shutter arrays, specifically, a red shutter array 14R, a green shutter array 14G, and a blue shutter array 14B.

Liquid crystal shutter 14 is formed as follows: a transparent electrode is deposited over an entire surface of a liquid crystal cell or substrate 16 and micro-shutter elements 17, each formed at an intersection of $3 \times 480$ ($= 1440$) transparent electrodes, are deposited on the other surface of liquid crystal cell 16. These micro-shutter elements 17 are separated from one another by black separating bands or portions 18. The transparent electrode deposited on the one surface of liquid crstyal cell 16 is connected to electrical ground via a ground terminal GND, whereas the $3 \times 480$ micro-shutter elements 17 deposited on the other surface of the liquid crystal cell 16 are each supplied with a predetermined voltage by respectively turning ON and OFF switching transistors (not shown) through three electrodes Y1, Y2, Y3 and through 480 electrodes X1, X2, . . . , X480. The optical transmissivity of each of the micro-shutter elements 17 can be controlled by the magnitude and frequency of the voltage supplied thereto through the respective electrodes. The 480 micro-shutter elements 17 corresponding to electrode Y1 constitute the red shutter array 14R, so that the micro-shutter elements 17 forming the red micro-shutter array 14R can be respectively regarded as red pixels, R1 to R480. In the same fashion, the 480 micro-shutter elements 17 forming the green micro-shutter array 14G can be respectively regarded as green pixels, G1 to G480, and the blue micro-shutter array 14B can be regarded as blue pixels, B1 to B480, respectively.

The control circuit for controlling the color video printer of the embodiment of FIG. 2 will be described with reference to FIG. 4, in which it is seen that a video signal VS reproduced by an electronic still camera, for example, is supplied through an input terminal 19 to an RGB separating circuit 20 and also to a timing signal generating circuit 21. RGB separating circuit 20 separates the video signal VS into a red signal R, a green signal G, and a blue signal B. These signals R, G, and B are supplied to input terminals of respective analog-to-digital (A/D) converters 22R, 22G, and 22B. Timing signal generating circuit 21 generates a timing pulse in synchronism with the vertical and horizontal synchronizing signals that are separated therein from the video signal VS. The timing pulse is supplied from timing signal generator to each of the A/D converters 22R, 22G, and 22B.

The digital signals from A/D converters 22R, 22G, and 22B are written into respective memories 23R, 23G, and 23B. The read and write operations of each of memories 23R, 23G, and 23B are controlled by a read/write control circuit 24. An address signal generating circuit 25 is supplied with a timing signal from timing signal generating circuit 21 and, in turn, supplies memories 23R, 23G, and 23B with address signals, which will be described in detail below. A system bus line 26 is comprised of a data bus line, an address bus line, a control bus line, and the like and is connected to a central processing unit (CPU) 27, so that CPU 27 can control the operation of the entire color video printer of this embodiment.

Digital data read-out from memories 23R, 23G, and 23B are supplied to respective digital-to-analog (D/A) converters 28R, 28G, and 28B for conversion to analog data. The converted R, G, and B analog signals are supplied to a liquid crystal driver 29, which drives the three electrodes Y1, Y2, and Y3 and the 480 electrodes X1 to X480 of liquid crystal shutter 14 on the basis of the three primary color signals R, G, and B input thereto.

Assuming that each of memories 23R, 23G, and 23B stores primary color video signals of the first horizontal scanning period at respective addresses $A_0$ to $A_0 + \Delta A$ and stores primary color video signals of the $n^{th}$ horizontal scanning period at respective addresses $A_0 + (n-1)\Delta A$ to $A_0 + n\Delta A$ thereof, where n is 1, 2, 3, . . . , then when the printing operation is effected by this embodiment, the read addresses $A_1$, $A_2$ and $A_3$, to be respectively supplied from address signal generating circuit 25 to memories 23R, 23G, and 23B, are determined to satisfy the following equations:

$$A_2 = A_1 + \Delta A \quad (1)$$

$$A_3 = A_2 + \Delta A \quad (2)$$

More specifically, when the red signal of the $n^{th}$ horizontal scanning period is read out, the green signal G of the $(n+1)^{th}$ horizontal scanning period is read out and the blue signal B of the $(n+2)^{th}$ horizontal scanning period is read out, whereby the same portion of film 5 is exposed three times, once each by the red light, the green light, and the blue light in a line-sequential manner as will be described below.

Figure 4:
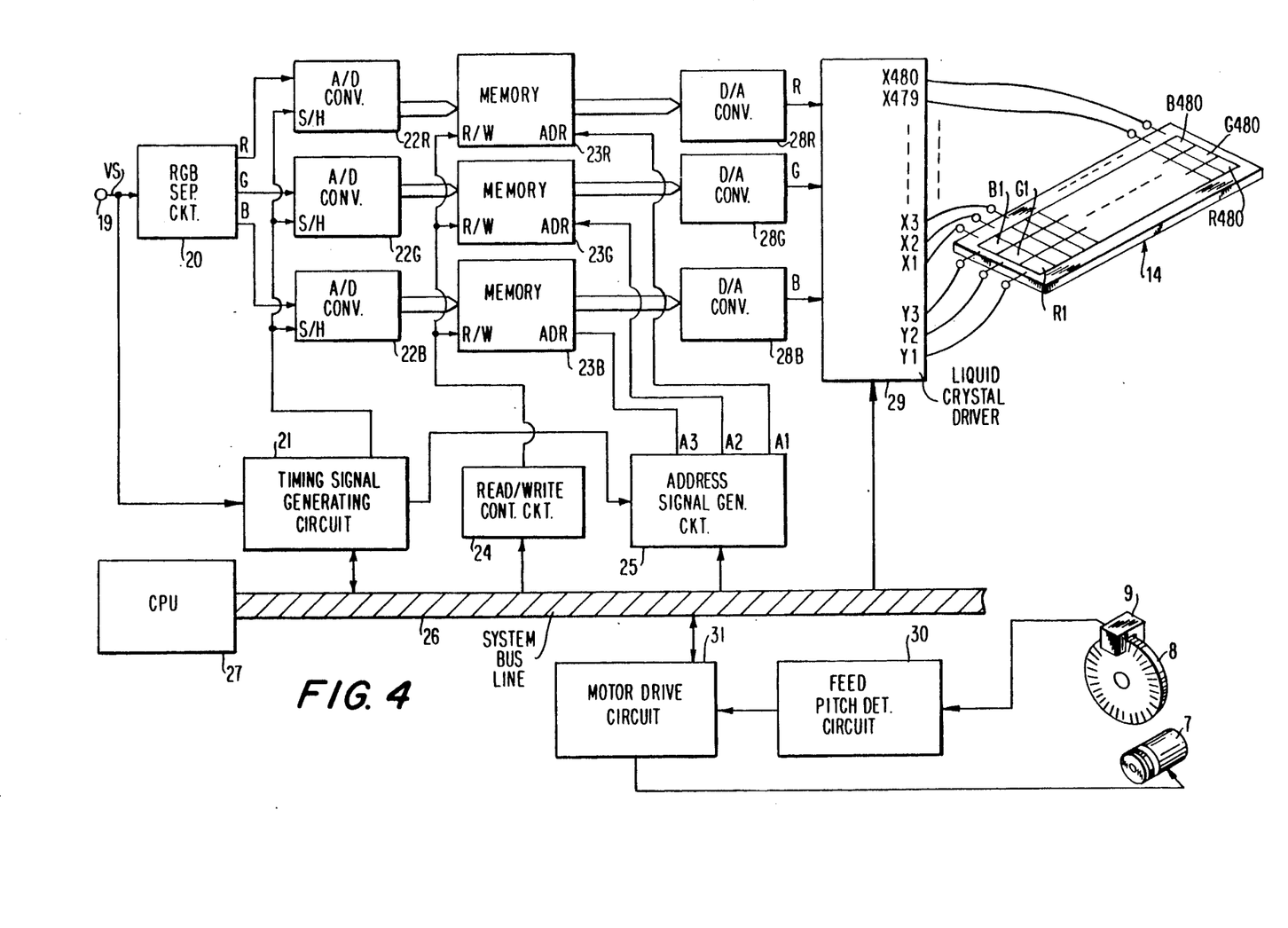
FIG. 4 is a block diagram of a control circuit for a color video printer according to an embodiment of the present invention, shown with portions of the printer in perspective-view fashion.

As shown in FIG. 4, a feed pitch detecting circuit 30 is supplied with detection signal pulses generated by detector 9 of the rotary encoder. Feed pitch detecting circuit 30 counts the number of detection pulses in an accumulation fashion, and supplies the count value to CPU 27 through a motor drive circuit 31, so that motor drive circuit 31 continues driving motor 7 until the count value reaches a certain value specified by the CPU 27. Thus, film 5 gripped by rollers 6A and 6B can be sequentially transported by a predetermined pitch P.

Figure 5A:
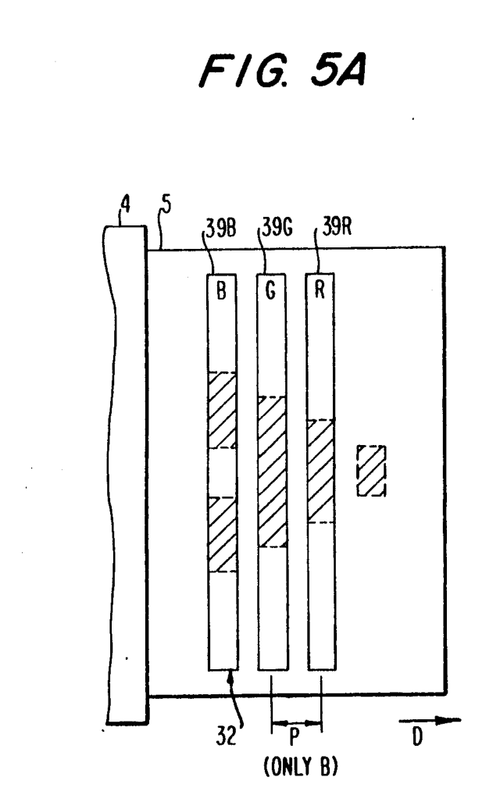
FIGS. 5A to 5C are plan views of a photosensitive sheet that has been exposed by operation of the printer according to an embodiment of the present invention.

An example of the operation for forming a hard copy by use of the apparatus of the embodiment of FIG. 2 will be described in relation to FIGS. 5A-5C. In FIG. 5A, visual images (or latent images) 39R, 39G, and 39B of the respective red shutter array 14R, green shutter array 14G, and blue shutter array 14B comprising the three rows of liquid crystal shutter 14 are formed on film 5 by lens array 15 in a line-sequential fashion. It is assumed that red image 39R corresponds to the $N^{th}$ horizontal scanning line due to the action of address signal generating circuit 25, and green image 39G and blue image 39B, respectively, correspond to the $(N+1)^{th}$ and $(N+2)^{th}$ horizontal scanning lines, and the pitch of the three images 39R, 39G, and 39B corresponds to P. In order to simplify the explanation only one image line 32 will be described. In such case, the blue image 39B is formed at the hatched portions of image line 32 on film 5 and exposed thereat for a predetermined period of time using light source 12 of FIG. 2, for example.

Figure 5B:
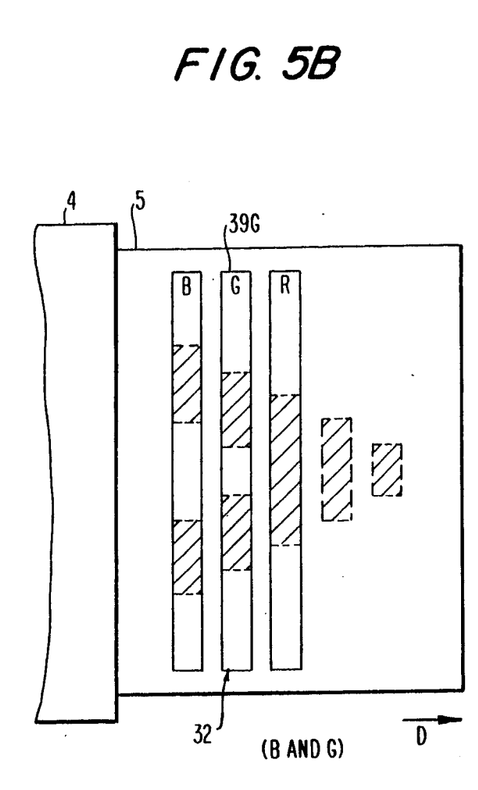

Next, from the state as shown FIG. 5A, film 5 is moved in direction D by one pitch P, so that film 5 is placed in the state shown in FIG. 5B, and the read address produced by address signal generating circuit 26 is increased by ΔA. Now, as explained above, the red image 39R, the green image 39G, and the blue image 39B correspond respectively to the $(N+1)^{th}$ horizontal scanning line, the $(N+2)^{th}$ horizontal scanning line, and the $(N+3)^{th}$ horizontal scanning line. Then, the green color light is projected to form green image 39G at the hatched portions of line image 32 on film 5 and exposed for a predetermined period of time.

Figure 5C:
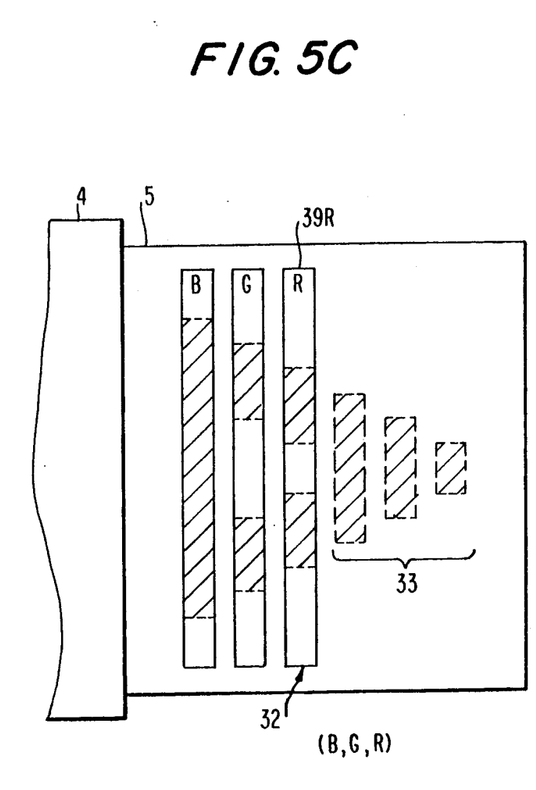

Further, from the state as shown in FIG. 5B, film 5 is moved in direction D by one pitch P, so that film 5 is placed in the state as shown in FIG. 5C, and the read address produced by the address signal generating circuit 26 is increased by ΔA. Therefore, the red image 39R, green image 39G, and blue image 39B correspond respectively to the $(N+2)^{th}$ horizontal scanning line, $(N+3)^{th}$ horizontal scanning line and $(N+4)^{th}$ horizontal scanning line. Then, the red color light is projected to form red image 39R at the hatched portions on line image 32 on film 5 and exposed for a predetermined period of time.

Accordingly, the three primary color signals are superimposed at line image 32 on film 5 in a line-sequential fashion and exposed thereat in additive primary-color fashion, whereby a visual color image corresponding to the $(N+2)^{th}$ horizontal scanning line is formed. In the same fashion, a visual color image corresponding to the horizontal scanning line above the $(N+2)^{th}$ horizontal scanning line was formed in an area 33 of film 5 as shown in FIG. 5C.

Therefore, according to this embodiment, the area corresponding to the image of each single micro-shutter element 17 of liquid crystal shutter 14 can be formed as a visual image of a desired color, so that resolution of the resultant color visual image can be improved by about three times compared with the previously proposed system described above in relation to FIG. 1 that results in three separate primary color areas for each pixel.

When using liquid crystal shutter 14 as shown in FIG. 3, the existence of the black separating area 18 sets a limit on the effective area of the image of micro-shutter element 17 in a range from 50% to 70%, thereby limiting the image quality of the color visual image that is formed.

Figure 6:
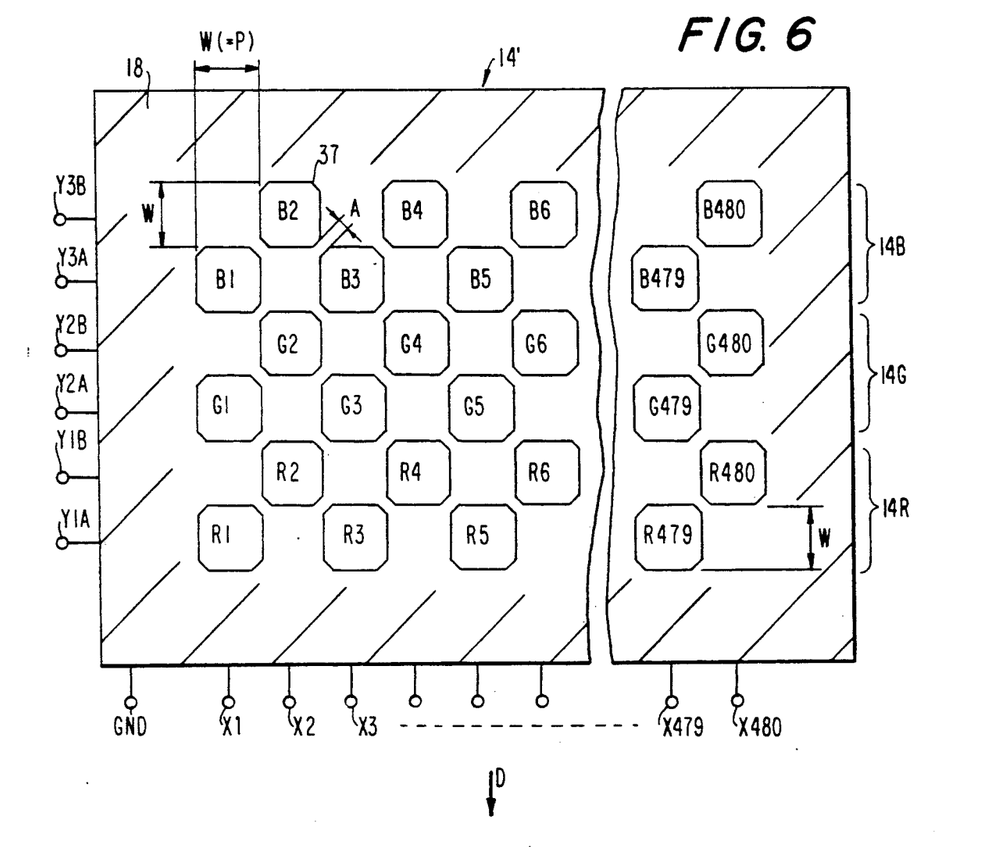
FIG. 6 is a plan view of a liquid crystal shutter according to a second embodiment of the present invention.
Figure 7:
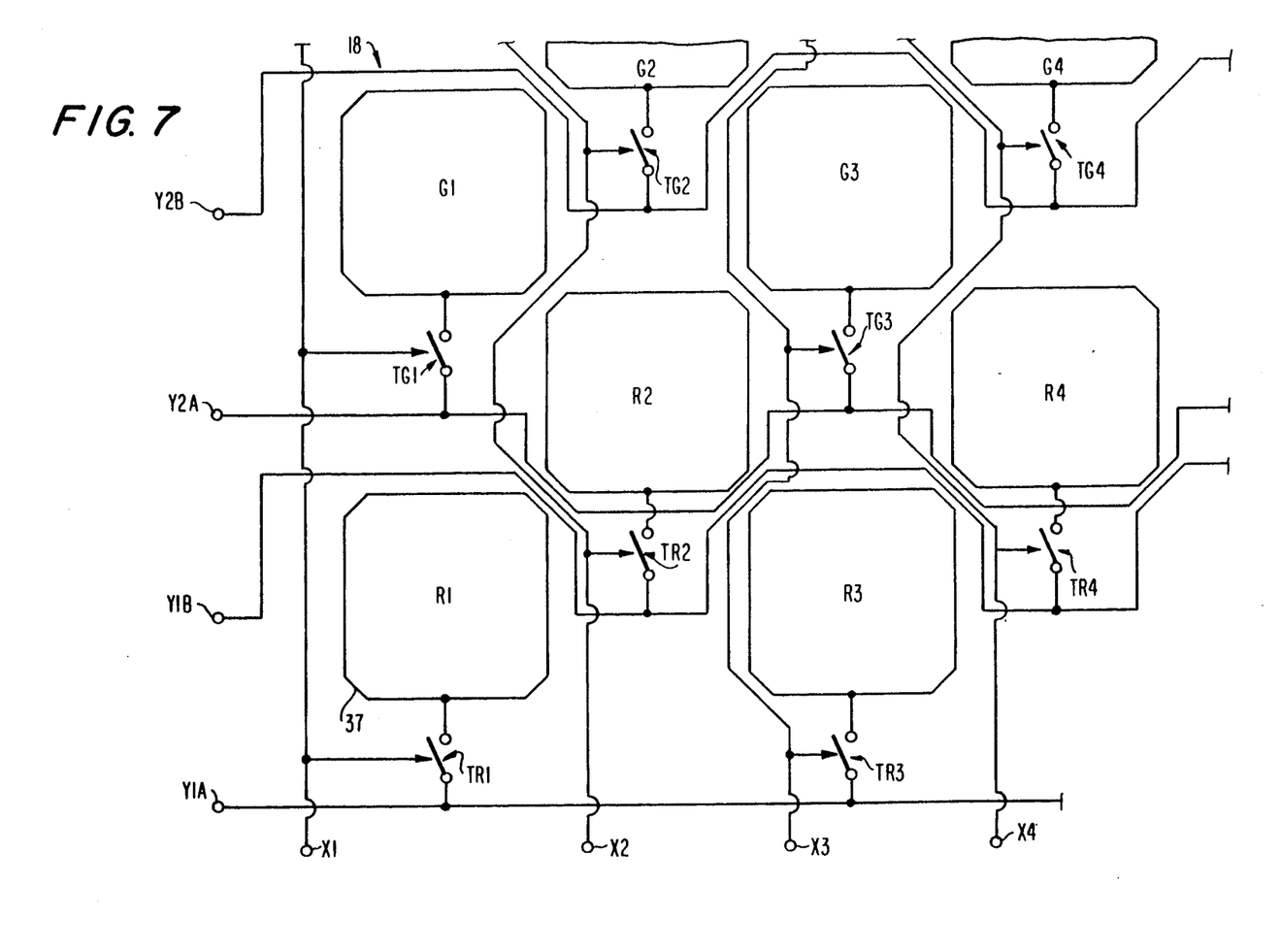
FIG. 7 is a enlarged plan view of a portion of the second embodiment of the invention shown in FIG. 6.

An example of hard-copy printing apparatus according to the present invention that can improve the quality of such color image is described with reference to FIGS. 6 and 7. In FIG. 6, a liquid crystal shutter 14' is provided with $3 \times 480$ ($=1440$) micro-shutter elements 37 having a size or area selected as $W \times W$ ($W=P$). The spacing between micro-shutter elements 37 is covered by the black separating area 18. Similarly to the example described in relation to FIG. 3, liquid crystal shutter 14' is divided in the direction transverse to direction D into groups forming the red shutter array 14R, the green shutter array 14G, and the blue shutter array 14B. Picture elements R1 to R480 of the red shutter array 14R are alternately arranged in a staggered pattern, and picture elements G1 to G480 of green shutter array 14G and picture elements B1 to B480 of blue shutter array 14B are also respectively arranged in staggered patterns, thereby aligning the six rows of liquid crystal shutter 14' transverse to direction D. These six rows of micro-shutter elements 37 from a so-called checker-board pattern. The alignment pitch of each row in the direction D is also selected as W and the four corner portions of each of the micro-shutter elements 37 are cut-off or rounded. The black separating portion 18 is also formed in the portion A between the rounded corner portions of adjacent micro-shutter elements 37. The electrical connection lines are located within the spacing A, as will be described below. As an example of the size and scale of this shutter, when the pitch W is selected to be 150 μm, the spacing A falls within a range of from 20 μm to 30 μm.

Six terminals Y1A, Y1B, Y2A, Y2B, Y3A, and Y3B are provided in association with the six rows of micro-shutters 37, and 480 terminals X1 to X480 are provided in the direction perpendicular to these six rows. By applying a predetermined voltage between one of these six terminals, Y1A to Y3B, and one of these 480 terminals, X1 to X480, it is possible to open and/or close a desired one of the 1440 micro-shutter elements 37.

The construction of the liquid crystal shutter 14' of the embodiment shown in FIG. 6 will be described more fully with reference to FIG. 7. As shown therein terminal Y1A is connected to red picture elements R1, R3, . . . , each being formed of a transparent electrode, through switching transistors TR1, TR3, . . . , shown diagrammatically as a switch. Terminal Y1B is connected to red picture elements R2, R4, . . . , through transistors TR2, TR4, . . . ; terminal Y2A is connected to green picture elements G1, G3, . . . , through transistors TG1, TG3, . . . , and terminals Y2B, Y3A, and Y3B are similarly connected. The gate terminals of transistor TR1, TG1, . . . are connected to terminal X1; the gate terminals of transistors TR2, TG2, . . . are connected to the terminal X2; and the gate terminals of the transistors TR3, TG3, . . . are connected to the terminal X3. The conductors and the switching transistors are all formed in the black separating area 18 of the liquid crystal shutter 14', so as not to occlude the transparent shutters 37.

When the liquid crystal shutter array 14' in the embodiment of FIG. 6 is operated, the shutter arrays corresponding to the terminals Y1A to Y3B are opened and/or closed by the $(N)^{th}$ horizontal scanning signal to the $(N+5)^{th}$ horizontal scanning signal. Simultaneously, terminals Y1A and Y1B are opened and/or closed by the red signal; terminals Y2A and Y2B are opened and/or closed by the green signal; and terminals Y3A and Y3B are opened and/or closed by the blue signal, respectively. Thus, when the film 5 is moved in the direction D by the pitch P ($=W$) using the liquid crystal shutter 14' of the embodiment of FIG. 6, with respect to the red color, for example, visual images of red picture elements R1, R3, . . . , R479 and visual images of red picture elements R2, R4, . . . , R480 are sequentially exposed on certain positions of film 5. In that case, the visual image of the black separating band 18 is eliminated from film 5. Upon moving film 5 five times in the direction D by pitch P, the visual images of red, green, and blue shutter elements are superimposed and exposed at certain positions on film 5 in an additive, primary-color fashion.

As described above, upon using the liquid crystal shutter 14' of the embodiment of FIG. 6, the film portion corresponding to the visual image of one micro-shutter element 37 can be colored by a desired color so that the resolution of resultant color image can be improved by more than three times as compared with previously proposed devices that required three individual colored portions for each pixel.

Further, the red shutter array 14R, the green shutter array 14G, and the blue shutter array 14B are formed by arranging the micro-shutter 37 in a checker-board pattern and visual images of respective picture elements are sequentially exposed after moving the film one pitch P, whereby the visual image of the black separating area 18 is substantially absent from film 5. This improves the quality of the color visual image that can be provided.

Figure 8:
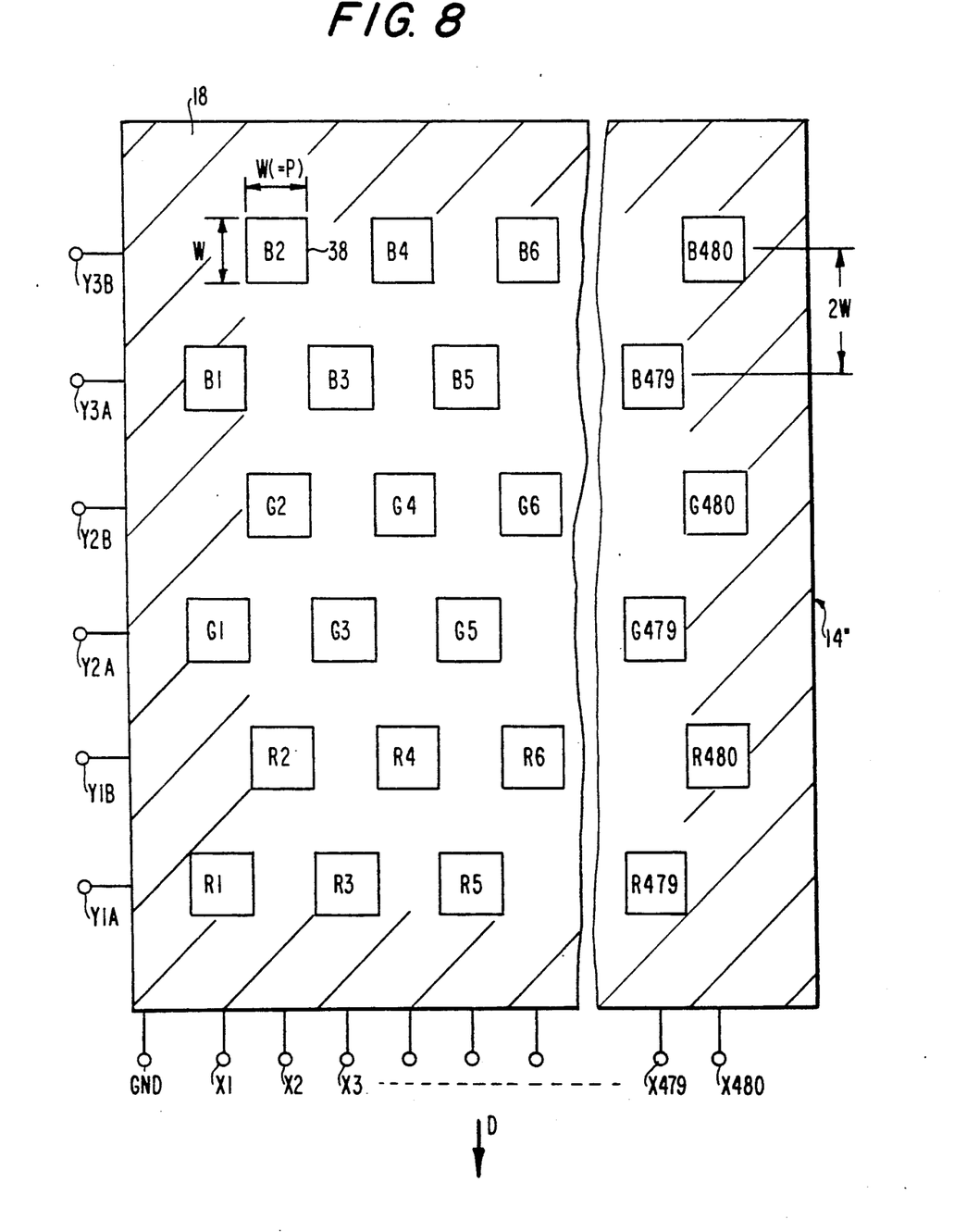
FIG. 8 is a plan view of a liquid crystal shutter according to another embodiment of the invention.

The liquid crystal shutter 14' of the embodiment of FIG. 6 may be replaced with the liquid crystal shutter 14" as shown in FIG. 8. In FIG. 8, like parts corresponding to those of FIG. 6 have the same reference numbers and need not be described in detail.

In FIG. 8, liquid crystal shutter 14" is formed of a square micro-shutter elements 38, each having a side dimension represented by W that is equal to the film transport pitch P. In the liquid crystal shutter 14", there are once again $3 \times 480 = 1440$ micro-shutter elements 38, which are now arranged in six rows in a checker-board pattern similar to that of the embodiment of FIG. 6, however, the pitch between the adjacent rows in the D direction is 2W.

When the liquid crystal shutter 14" is driven, micro-shutter elements 38 arranged in the six rows are sequentially opened and/or closed by the $N^{th}$ horizontal scanning signal, $(N+2)^{th}$ horizontal scanning signal, $(N+4)^{th}$ horizontal scanning signal, ... $(N+10)^{th}$ horizontal scanning signal. Simultaneously, these micro-shutter elements 38 that are arranged in the six rows are opened and/or closed by the red, green and blue signals in units of two rows, respectively. After exposing the even-numbered lines, the film is moved one pitch P and then the odd-numbered lines are exposed.

With the liquid crystal shutter 14", the resolution of color visual image can be improved, and any image of the black separating area 18 between micro-shutter elements 38 can be prevented from being reproduced. Thus, the quality of color visual image can be improved.

Further, according to the embodiment shown in FIG. 8, each micro-shutter element 38 is formed as a perfect square having one side equal to W or slightly larger than W, where W equals the line pitch P, so that any visual image of the black separating area 18 can be removed from the film completely.

Figure 9:
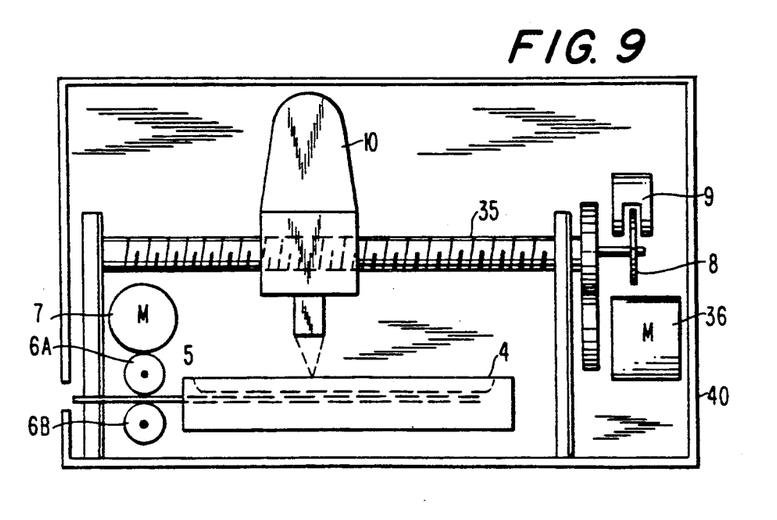
FIG. 9 is a diagrammatic representation of a modification of the embodiment of FIG. 2.

Although in the embodiment shown in FIG. 2, liquid crystal printing head 10 is fixed and film 5 is moved, in another embodiment as shown in FIG. 9 film 5 is fixed and liquid crystal printing head 10 is sequentially moved by the predetermined pitch P. In FIG. 9, in which like parts corresponding to those of FIG. 2 are marked with the same references and are not described in detail, liquid crystal printing head 10 is moved by a feed screw 35 that is rotated by a motor 36. A housing or cover 40 is provided for this color video printer and disc plate 8 of the rotary encoder is secured to feed screw 35, and its detector 9 is attached to cover 40. At the completion of the film printing operation, film 5 is ejected outside of cover 40 by the operation of the pair of rollers 6A, 6B and motor 7.

According to one aspect of the present invention, the same portion of the color sensitive printing paper is exposed three times by the red, green, and blue shutter arrays in an additive primary-color fashion, whereby the resolution of the resultant color image can be improved by about three times as compared with the prior art.

According to another aspect of the present invention, the effective ratio in which the visual image of the liquid crystal shutter is formed on the color sensitive printing paper can be substantially 100%, thereby improving the image quality.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

I claim:

1. A color video printer for printing on a color sensitive record medium comprising:

an elongate liquid crystal body extending in a lateral direction relative to the record medium, said liquid crystal body including a first shutter array for a first color, a second shutter array for a second color, and a third shutter array for a third color, wherein each of said shutter array includes a plurality of micro-shutter elements arranged on said liquid crystal body in a checker-board pattern and wherein switching devices for said micro-shutter elements are formed on said liquid crystal body at portions thereof where said micro-shutter elements are absent in said checker-board pattern of said micro-shutter elements;

means for supplying first, second, and third color signals to said first, second, and third shutter arrays, respectively, for selectively actuating said shutter arrays; and means for providing relative motion between said liquid crystal body and a color sensitive record medium to effect scanning of said record medium by said liquid crystal body.

2. A color video printer according to claim 1, further comprising optical means provided between said liquid crystal body and said color sensitive record medium for projecting a color image through said shutter arrays onto said color sensitive record medium.

3. A color video printer according to claim 1, wherein each of said plurality of micro-shutter elements includes an aperture having a width W, and is aligned in the lateral direction by an alignment pitch of twice the width W of each of said plurality of micro-shutter elements.

4. A color printer according to claim 1, wherein each of said micro-shutter elements is formed as an eight-sided element substantially square in shape and having each corner of the square cut off.

5. A color printer according to claim 4, wherein said switching devices are interconnected by electrical conductors formed on said liquid crystal body and passing among said micro-shutter elements adjacent the cut-off corners thereof.

* * * * *